US007216149B1

(12) United States Patent
Briscoe et al.

(10) Patent No.: US 7,216,149 B1
(45) Date of Patent: May 8, 2007

(54) GATHERING ENRICHED WEB SERVER ACTIVITY DATA OF CACHED WEB CONTENT

(75) Inventors: Paul Roger Briscoe, Portsmouth (GB); Cameron Donald Ferstat, Gladesville (AU); Matthew Robert Ganis, Carmel, NY (US); Stephen Carl Hammer, Kennesaw, GA (US); Gary Bob Kip Hansen, Saugerties, NY (US); Sean Alan Harp, Marietta, GA (US); Michael Shannon Nichols, Southlake, TX (US); Herbert Daniel Pearthree, Cary, NC (US); Paul Reed, Sydney (AU); Brian James Snitzer, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 885 days.

(21) Appl. No.: 09/641,495

(22) Filed: Aug. 18, 2000

(51) Int. Cl.
G06F 15/16 (2006.01)
(52) U.S. Cl. ...................... 709/217; 709/203; 709/219; 711/138
(58) Field of Classification Search ................ 709/219, 709/217–218, 223–229; 711/138
See application file for complete search history.

(56) References Cited

U.S. PATENT DOCUMENTS

| | | | | | |
|---|---|---|---|---|---|
| 5,796,952 | A | * | 8/1998 | Davis et al. | 709/224 |
| 5,848,396 | A | * | 12/1998 | Gerace | 705/10 |
| 5,892,917 | A | * | 4/1999 | Myerson | 709/224 |
| 5,913,041 | A | * | 6/1999 | Ramanathan et al. | 709/233 |
| 5,935,207 | A | * | 8/1999 | Logue et al. | 709/219 |
| 5,991,735 | A | * | 11/1999 | Gerace | 705/10 |
| 6,018,619 | A | * | 1/2000 | Allard et al. | 709/224 |
| 6,018,763 | A | * | 1/2000 | Hughes et al. | 709/213 |
| 6,023,726 | A | * | 2/2000 | Saksena | 709/219 |
| 6,041,355 | A | * | 3/2000 | Toga | 709/227 |
| 6,085,229 | A | * | 7/2000 | Newman et al. | 709/203 |

(Continued)

OTHER PUBLICATIONS

Computer Knowledge Newsletter—Nov. 1999 Issue.

(Continued)

*Primary Examiner*—Ario Etienne
*Assistant Examiner*—LaShonda Jacobs
(74) *Attorney, Agent, or Firm*—John Pivnichny, Esq.; Greenblum & Bernstein P.L.C.

(57) ABSTRACT

A method and system for gathering enriched web server activity data in a global communications network in which requested information files are cached at a plurality of network devices. With the prevalence of web caching on the Internet, the origin web servers do not serve the majority of requests for web site content. A single pixel clear Graphics Image Format (GIF) request is added to the HyperText Markup Language (HTML) source file for a web page. Appended to the GIF request is a Common Gateway Interface (CGI) string of data that contains enhanced web activity data information, including the number of images ("hits") that have to be retrieved by a client browser to build the web page, and the referring identifier that resulted in access to the web page. The single pixel clear GIF request is not cacheable and results in the request being transmitted to the origin web server when the client browser interprets the HTML file. The enriched data is stored in log files at the origin web server to accumulate an accurate number of hits on the web page.

42 Claims, 15 Drawing Sheets

U.S. PATENT DOCUMENTS 6,094,662 A * 7/2000 Hawes .................... 707/104.1
6,363,418 B1 * 3/2002 Conboy et al. ............. 709/218
6,385,642 B1 * 5/2002 Chlan et al. ................ 709/203
6,393,479 B1 * 5/2002 Glommen et al. .......... 709/224
6,606,581 B1 * 8/2003 Nickerson et al. .......... 702/186
6,742,040 B1 * 5/2004 Toga .......................... 709/229
2002/0004733 A1 * 1/2002 Addante ....................... 705/7
2002/0147772 A1 * 10/2002 Glommen

OTHER PUBLICATIONS

PCT/EP01/09308, PCT Preliminary Examination Report, Jul. 3, 2003, European Patent Office.

* cited by examiner

```
<SCRIPT LANGUAGE="JavaScript">
self.onerror = null;
var r = "";
if (top.document.referrer) {r='&ref='+top.document.referrer };
document.write('<IMG ALT="" SRC="http://census.rolandgarros.org/rc/images
/uc.GIF?pag=' + location.pathname + '&num=14' + r + '" WIDTH=600 HEIGHT=1
BORDER=0><BR CLEAR="LEFT">');
</SCRIPT>
<NOSCRIPT>
<IMG ALT="" SRC="http://census.rolandgarros.org/rc/images/uc.GIF?pag=/
en/index.html&num=14" WIDTH=600 HEIGHT=1 BORDER=0>
<BR CLEAR = "LEFT">
</NOSCRIPT>
```

Fig. 2

Site Level Analysis

| Measurement | Week Ending 05/27/2000 | Week Ending 06/03/2000 | Week Ending 06/10/2000 | Week Ending 06/17/2000 | Week Ending 06/24/2000 |
|---|---|---|---|---|---|
| Hits | 28,022,624 | 446,484,591 | 513,221,108 | 30,641,781 | 2,556,409 |
| Pages | 1,979,554 | 23,110,173 | 29,795,446 | 2,364,407 | 196,864 |
| Bytes | 2,461,860,148 | 29,292,968,408 | 20,760,524,625 | 1,357,698,866 | 147,157,173 |
| Seconds/Page View | 54.37 | 79.87 | 86.86 | 70.83 | 50.99 |
| Visits | 274,344 | 2,186,788 | 2,664,775 | 296,378 | 35,038 |
| Hits/Visit | 102.14 | 204.17 | 192.59 | 103.38 | 72.96 |
| Page Views/Visit | 7.21 | 10.56 | 11.18 | 7.97 | 5.61 |
| Seconds/Visit | 411.77 | 835.36 | 922.17 | 525.98 | 343.50 |

Download comma delimited format: Site Level Analysis

☐ Custom Date Range [ 04/27/2000 ▼ ] [ 04/27/2000 ▼ ]

○ Overall   ○ Month Granularity   ● Week Granularity   ○ Day Granularity

[ Display ]

[ Save Report ]   [ Run Report Offline ]

FIG. 4

Referral Categories

| Referral Category +]All −]All | Week Ending 05/27/2000 | Week Ending 06/03/2000 | Week Ending 06/10/2000 | Week Ending 06/17/2000 | Week Ending 06/24/2000 |
|---|---|---|---|---|---|
| Traffic Information ||||||
| Commercial +] | 101,860 | 1,473,272 | 2,195,979 | 183,738 | 23,660 |
| Education | 842 | 5,131 | 6,861 | 740 | 389 |
| Government +] | 1 | 67 | 279 | 16 | 0 |
| IBM +] | 83 | 1,396 | 2,774 | 182 | 78 |
| Internal Referrals | 847,946 | 8,130,701 | 9,040,165 | 885,960 | 34,822 |
| ISPs +] | 4,259 | 33,880 | 40,296 | 6,911 | 1,942 |
| No Referral | 921,941 | 12,599,687 | 17,209,312 | 1,186,098 | 109,953 |
| Organizations | 7,281 | 62,286 | 65,047 | 4,757 | 935 |
| Search Engines and Directories +] | 95,341 | 803,753 | 1,234,733 | 96,005 | 25,085 |
| Site Total Page Views | 1,979,554 | 23,110,173 | 29,795,446 | 2,364,407 | 196,864 |

Download comma delimited format: Page Views

| Area of Analysis || Measurements ||
|---|---|---|---|
| ○ Traffic Type | ○ Visitor Entry Page | Traffic | Visit |
| ○ Traffic Category | ○ Visitor Exit Page | ☑ Page Views | ☐ Visits |
| ○ Visitor SubDomain | ○ Visitor Browser | ☐ Seconds/Page View | ☐ Page Views/Visit |
| ○ Visitor Domain | ○ Visitor Platform | | ☐ Seconds/Visit |
| ⦿ Visitor Referral | ○ Usage Group | | |
| | ○ Ad Analysis | ☐ Display Percentage of Total ||
| ☐ Custom Date Range [04/27/2000] [04/27/2000] ○ Overall ○ Month Granularity ⦿ Week Granularity ○ Day Granularity ||||
| ⦿ Show data by categories ○ Show data without categories ||||
| Display ||||

FIG. 5

Referral Category: Search Engines and Directories - Display: Referral SubCategories

| Referral Category | |
|---|---|
| Search Engines and Directories | |

| Referral Category ±All −All | Week Ending 05/27/2000 | Week Ending 06/03/2000 | Week Ending 06/10/2000 | Week Ending 06/17/2000 | Week Ending 06/24/2000 |
|---|---|---|---|---|---|
| Traffic Information | | | | | |
| AltaVista | 8,691 | 78,806 | 100,654 | 10,674 | 3,704 |
| AOL Search | 1,770 | 9,733 | 12,824 | 2,356 | 620 |
| Ask Jeeves | 50 | 14 | 62 | 12 | 7 |
| DirectHit | 182 | 190 | 493 | 12 | 9 |
| Excite | 1,805 | 14,124 | 14,719 | 2,271 | 544 |
| Go Network | 904 | 7,820 | 11,122 | 1,257 | 211 |
| Go To | 430 | 4,812 | 7,563 | 708 | 209 |
| Google | 1,719 | 16,063 | 23,832 | 2,581 | 895 |
| InfoSeek | 73 | 484 | 544 | 36 | 7 |
| LookSmart | 939 | 7,015 | 6,800 | 910 | 223 |
| Lycos | 2,249 | 12,487 | 15,732 | 2,306 | 1,346 |
| MSN | 5,800 | 67,979 | 103,375 | 9,841 | 2,069 |
| Netscape | 2,953 | 22,608 | 43,388 | 3,499 | 757 |
| Others | 519 | 4,971 | 7,176 | 1,350 | 300 |
| Snap | 708 | 3,728 | 6,084 | 700 | 94 |
| WebCrawler | 143 | 1,157 | 960 | 164 | 38 |
| Yahoo | 66,406 | 551,762 | 879,405 | 57,328 | 14,052 |
| Search Engines and Directories Total Page Views | 95,341 | 803,753 | 1,234,733 | 96,005 | 25,085 |

FIG. 6

Referral Category: AltaVista - Display: Referrals

| Referral Category |
|---|
| Search Engines and Directories |
| AltaVista |

| Referral | Week Ending 05/27/2000 | Week Ending 06/03/2000 |
|---|---:|---:|
| Traffic Information | | |
| ☐ www.altavista.com/cgi-bin/query | 6,988 | 65,936 |
| ☐ www.altavista.fr/cgi-bin/query | 857 | 6,437 |
| ☐ dir.altavista.com/Top/Sports/Tennis/Tournaments | 264 | 1,279 |
| ☐ altavista.fr/cgi-bin/query | 15 | 883 |
| ☐ dir.altavista.com/Top/Sports/Tennis/Tournaments/Grand_Slams | 76 | 424 |
| ☐ www.altavista.nl/cgi-bin/query | 82 | 189 |
| ☐ www.altavista.de/cgi-bin/query | 105 | 462 |
| ☐ www.altavista.co.uk/cgi-bin/query | 69 | 480 |
| ☐ ragingsearch.altavista.com/cgi-bin/query | 37 | 509 |
| ☐ altavista.advalvas.be/scripts/avsearch.dll | 40 | 482 |
| ☐ www.altavista.it/cgi-bin/query | 5 | 223 |
| ☐ dir.altavista.com/Top/Sports/Tennis | 38 | 151 |
| ☐ altavista.advalvas.be/scripts/AVsearch.dll | 10 | 94 |
| ☐ www.altavista/cgi-bin/query | 0 | 294 |
| ☐ altavista.de/cgi-bin/query | 1 | 218 |
| ☐ dir.altavista.com/Top/Sports | 1 | 100 |
| ☐ www.altavista.se/cgi-bin/query | 22 | 58 |
| ☐ www.altavista.ca/cgi-bin/query | 0 | 16 |
| ☐ www.altavista.com/ | 3 | 47 |
| ☐ www.altavista.fr/cgi-bin/rns | 0 | 38 |
| ☐ babelfish.altavista.com/translate.dyn | 5 | 89 |
| ☐ www.altavista.com/cgi-bin/telia | 1 | 0 |
| ☐ www.altavistacanada.com/cgi-bin/query | 23 | 37 |
| ☐ altavista.nl/cgi-bin/query | 1 | 37 |
| ☐ www.altavista.com//cgi-bin/query | 0 | 33 |
| Other AltaVista Page Views | 48 | 290 |
| AltaVista Total Page Views | 8,691 | 78,806 |

Content Categories

| Content Category ⊞All⊟All | Week Ending 05/06/2000 | Week Ending 05/13/2000 | Week Ending 05/20/2000 | Week Ending 05/27/2000 | Partial Week Ending 05/31/2000 |
|---|---|---|---|---|---|
| Traffic Information | | | | | |
| Draws ⊞ | 3,967 | 6,242 | 11,728 | 454,144 | 1,309,496 |
| Home Page | 19,795 | 26,741 | 40,105 | 227,260 | 1,122,583 |
| Live & Interactive ⊞ | 8,803 | 10,769 | 16,691 | 94,756 | 1,256,782 |
| News & Photos ⊞ | 11,161 | 14,958 | 23,150 | 170,123 | 869,688 |
| Players ⊞ | 20,187 | 27,500 | 45,654 | 271,198 | 1,054,758 |
| Roland Garros Generic Shop Home Page | 3,803 | 5,318 | 7,994 | 11,982 | 37 |
| Roland Garros World ⊞ | 5,224 | 6,460 | 9,224 | 27,627 | 56,953 |
| Scoreboard ⊞ | 2,816 | 3,828 | 6,296 | 390,599 | 6,461,861 |
| Shop ⊞ | 19 | 24 | 10 | 42,012 | 136,043 |
| Site Functions ⊞ | 2,908 | 4,488 | 7,047 | 22,514 | 48,532 |
| Splash ⊞ | 14,494 | 19,476 | 28,905 | 131,891 | 600,940 |
| Tournament ⊞ | 15,721 | 19,602 | 25,963 | 70,547 | 121,580 |
| Uncategorized | 374 | 493 | 675 | 64,266 | 235,021 |
| WAP ⊞ | 0 | 0 | 0 | 385 | 7,694 |
| Site Total Page Views | 109,272 | 145,899 | 223,442 | 1,979,304 | 13,281,968 |

Download comma delimited format: Page Views

FIG. 9

Content Category: Home Page - Display: Resources

Content Category
Home Page

| Resource | Week Ending 05/27/2000 | Week Ending 06/03/2000 | Week Ending 06/10/2000 | Week Ending 06/17/2000 | Week Ending 06/24/2000 |
|---|---|---|---|---|---|
| Traffic Information | | | | | |
| /en | 144,907 | 1,187,831 | 1,415,869 | 171,999 | 15,259 |
| /fr | 82,353 | 657,217 | 1,012,851 | 66,927 | 8,662 |
| /en/index.html | 0 | 8 | 0 | 0 | 0 |
| /fr/index.html=17 | 0 | 0 | 7 | 0 | 0 |
| /fr/index.html=16 | 0 | 1 | 2 | 0 | 0 |
| /fr/index.html=15 | 0 | 1 | 0 | 0 | 0 |
| /fr/index.html=18 | 0 | 0 | 1 | 0 | 0 |
| /fr/index.htmlm=17 | 0 | 0 | 1 | 0 | 0 |
| Home Page Total Page Views | 227,260 | 1,845,058 | 2,428,731 | 238,926 | 23,921 |

Download comma delimited format: Page Views

| Area of Analysis | | Measurements |
|---|---|---|
| ○ Traffic Type<br>● Traffic Category<br>○ Visitor SubDomain<br>○ Visitor Domain<br>○ Visitor Referral | ○ Visitor Entry Page<br>○ Usage Group | Traffic<br>☑ Page Views<br>☐ Seconds/Page View |
| | | ☐ Display Percentage of Total<br>Display Totals For:<br>☐ Site |
| ☐ Custom Date Range  04/27/2000 ▼  04/27/2000 ▼<br>○ Overall   ○ Month Granularity   ● Week Granularity   ○ Day Granularity | | |
| Minimum Page View Threshold: | | |
| ☑ Enable Single Object Selection | | |
| View Top [25]  Find It: [          ]  [Display] | | |

FIG. 10

Saved Reports
UserId: fropen00

Site Level Reports
Hourly Reports
Visit Distribution Reports
Traffic Reports
Content Reports
SubDomain Reports
Referral Reports
Domain Reports
Entry Page Reports
Exit Page Reports
Browser Reports
Platform Reports
Usage Group Reports
Ad Reports

FIG. 11A

Site Level Reports

| Name | Date Range | Granularity | Shared |
|---|---|---|---|
| Site Traffic | Most Recent 5 Weeks | Weekly | Yes(Standard) |

FIG. 11B

Visit Distribution Reports

| Name | Distribution Type | Date Range | Granularity | Shared |
|---|---|---|---|---|
| Minutes per Visit | Minutes/Visit | Most Recent 5 Weeks | Weekly | Yes (Standard) |
| Page Views per Visit | Page Views/ Visit | Most Recent 5 Weeks | Weekly | Yes (Standard) |

FIG. 11C

Traffic Reports

| Name | Usage Cluster | Filters | Traffic Measures | Visit Measures | View | Date Range | Granularity | Shared |
|---|---|---|---|---|---|---|---|---|
| Top 10 Most Requested Resources | All | None | Hits | None | Top 10 | Most Recent 5 Weeks | Weekly | Yes (Standard) |

FIG. 11D

Content Reports

| Name | Usage Cluster | Filters | Traffic Measures | Visit Measures | View | Date Range | Granularity | Shared |
|---|---|---|---|---|---|---|---|---|
| Top 10 Most Requested Pages | All | None | Pages | None | Top 10 | Most Recent 5 Weeks | Weekly | Yes (Standard) |

FIG. 11E

SubDomain Reports

| Name | Usage Cluster | Filters | Traffic Measures | Visit Measures | View | Date Range | Granularity | Shared |
|---|---|---|---|---|---|---|---|---|
| Top 10 SubDomains By Pages Viewed | All | None | Pages | None | Top 10 | Most Recent 5 Weeks | Weekly | Yes (Standard) |
| Top 10 SubDomains By Visits | All | None | None | Visits | Top 10 | Most Recent 5 Weeks | Weekly | Yes (Standard) |

FIG. 11F

Domain Reports

| Name | Usage Cluster | Filters | Traffic Measures | Visit Measures | View | Date Range | Granularity | Shared |
|---|---|---|---|---|---|---|---|---|
| Top 10 Domains By Pages Viewed | All | None | Pages | None | Top 10 | Most Recent 5 Weeks | Weekly | Yes (Standard) |
| Top 10 Domains By Visits | All | None | None | Visits | Top 10 | Most Recent 5 Weeks | Weekly | Yes (Standard) |

FIG. 11G

Referral Reports

| Name | Usage Cluster | Filters | Traffic Measures | Visit Measures | View | Date Range | Granularity | Shared |
|---|---|---|---|---|---|---|---|---|
| Top 10 Referrals By Pages Viewed | All | None | Pages | None | Top 10 | Most Recent 5 Weeks | Weekly | Yes (Standard) |
| Top 10 Referrals By Visits | All | None | None | Visits | Top 10 | Most Recent 5 Weeks | Weekly | Yes (Standard) |
| Referral Category | All | None | Pages | None | Top 25 | 04/27/2000 thru 04/27/2000 | Weekly | No |

FIG. 11H

Exit Page Reports

| Name | Usage Cluster | Filters | Traffic Measures | Visit Measures | View | Date Range | Granularity | Shared |
|---|---|---|---|---|---|---|---|---|
| Top 10 Exit Pages | All | None | None | Visits | Top 10 | Most Recent 5 Weeks | Weekly | Yes (Standard) |

FIG. 11I

Entry Page Reports

| Name | Usage Cluster | Filters | Traffic Measures | Visit Measures | View | Date Range | Granularity | Shared |
|---|---|---|---|---|---|---|---|---|
| Top 10 Entry Pages | All | None | None | Visits | Top 10 | Most Recent 5 Weeks | Weekly | Yes (Standard) |

FIG. 11J

Browser Reports

| Name | Usage Cluster | Filters | Traffic Measures | Visit Measures | View | Date Range | Granularity | Shared |
|---|---|---|---|---|---|---|---|---|
| Top 10 Browsers By Pages Viewed | All | None | Pages | None | Top 10 | Most Recent 5 Weeks | Weekly | Yes (Standard) |
| Top 10 Browsers By Visits | All | None | None | Visits | Top 10 | Most Recent 5 Weeks | Weekly | Yes (Standard) |

FIG. 11K

Platform Reports

| Name | Usage Cluster | Filters | Traffic Measures | Visit Measures | View | Date Range | Granularity | Shared |
|---|---|---|---|---|---|---|---|---|
| Top 10 Platforms By Pages Viewed | All | None | Pages | None | Top 10 | Most Recent 5 Weeks | Weekly | Yes (Standard) |
| Top 10 Platforms By Visits | All | None | None | Visits | Top 10 | Most Recent 5 Weeks | Weekly | Yes (Standard) |

Usage Group Reports

| Name | Usage Cluster | Filters | Traffic Measures | Visit Measures | View | Date Range | Granularity | Shared |
|---|---|---|---|---|---|---|---|---|
| Usage Cluster Visits | All | None | None | Visits | Categorical | Most Recent 5 Weeks | Weekly | Yes (Standard) |

FIG. 11L

Ad Reports

| Name | Usage Cluster | Filters | Traffic Measures | Visit Measures | View | Date Range | Granularity | Shared |
|---|---|---|---|---|---|---|---|---|
| Top 10 Ads by Impressions | All | None | Impressions | None | Top 10 | Most Recent 5 Weeks | Weekly | Yes (Standard) |

FIG. 11M

GATHERING ENRICHED WEB SERVER ACTIVITY DATA OF CACHED WEB CONTENT

BACKGROUND OF THE INVENTION

The present invention relates generally to client-server computer systems and, more specifically, to information access requests to a web site server over a global communications network.

All web pages are written with HyperText Markup Language (HTML). Hypertext and universality are two essential features of HTML. Hypertext means that a programmer can create a link on a web page that leads the visitor to any other web page or to practically anything else on the Internet. Hypertext enables information on the web to be accessed from many different directions. Universality means that because HTML documents are saved as ASCII or text only files, virtually any computer can read a web page. HTML lets the web designer format text, add graphics, sound, and video, and save it all in a text or an American Standard Code for Information Interchange (ASCII) file that any computer can read. The key to HTML is in the tags, which are key words enclosed between less than (<) and greater than (>) signs, that indicate the type of content coming up next. While practically any computer can display web pages, how those pages actually look depends on the type of computer, the monitor, the speed of the Internet connection, and the browser software used to view the page.

Advanced web designers often use a scripting language called JavaScript and a system of naming parts of the web page called the document object model (DOM), together with HTML to create dynamic content on a page. These effects are sometimes called dynamic HTML, or DHTML. HTML tags are commands written between angle brackets (< >) that indicate how the browser should display the text. Examples of HTML tags are BASE, FORM, FRAME, IMG and SCRIPT. There are opening and closing versions for many tags and the affected text is contained within the two tags. The opening and closing tags use the same command word; the closing tag carries an initial forward slash (/) symbol. Many tags have special attributes that offer a variety of options for the contained text. The attribute is entered between the command word and the final angle bracket. A series of attributes can be used in a single tag just by writing one after the other, in any order, with a space separating each one. The attributes in turn, often have values. In some cases, a selection of value is made from a small group of choices. Other attributes are more strict about the type of values they accept. Examples of attributes are HREF, SRC, ACCESSKEY and VALUE.

A web page is nothing more than a text document written with HTML tags. Like any other text document, web pages have a file name that identifies the documents to the web site designer, the web site visitors, and a visitor's web browser. Uniform Resource Locators (URLs) contain information about where a file is located and what a browser should do with it. Each file on the Internet has a unique URL. The first part of the URL is called the scheme. It tells the browser how to deal with the file that it is about to open. One of the most common schemes to access web pages is HyperText Transfer Protocol (HTTP). The second part of the URL is the name of a server where the file is located followed by the path that leads to the file and the file name. Sometimes, a URL ends in a trailing forward slash with no file name given. In this case, the URL refers to the default file in the last directory in the path (i.e., index.html), which generally corresponds to the home page. For example, consider the web address "census.rolandgarros.org/rc/images/ . . . ". The domain name is "census.rolandgarros.org". This is the specific host computer on which corresponding web pages reside. The next segment of the URL is the directory ("rc") and subdirectory "images") on the host computer that contains a specific web site. The last segment of the URL, represented by the ellipsis mark, is the filename of the specific web page being requested.

URLs can be either absolute or relative. An absolute URL shows the entire path to the file, including the scheme, server name, the complete path, and the file name itself. A relative URL describes the location of the desired file with reference to the location of the file that contains the URL itself. The relative URL for a file that is in the same directory as the current file is simply the file name and extension.

To view a single page, the browser running on a client computer, may request and download numerous files from a web site server. The number of object access requests ("hits") stored in the web site server's access log will typically exceed the number of distinct client sessions in which clients are accessing information on the web site, reducing the accuracy of the access log.

Data networking is growing at a phenomenal rate. The number of web users is expected to increase by a factor of five over the next few years. The resulting uncontrolled growth of web access requirements is straining all attempts to meet the bandwidth demand. Additionally, although the volume of web traffic on the Internet is staggering, a large percentage of that traffic is redundant, i.e., multiple users at any given site request much of the same content. This means that a significant percentage of the wide area network (WAN) infrastructure carries the identical content and identical requests for accessing it daily. Web caching performs a local storage of web content to serve these redundant user requests more quickly, without sending the requests and the resulting content over the wide area network.

Caching is the technique of keeping frequently accessed information in a location close to the requester. A web cache stores web pages and content on a storage device that is physically or logically closer to the user. This access to stored web content is closer and faster than a web lookup. By reducing the amount of traffic on wide area network links and on already overburdened web servers, caching provides significant benefits to Internet Service Providers (ISPs), enterprise networks, and end users. The two key benefits of web caching are cost savings due to the reduction of WAN bandwidth and improved productivity for end users resulting from quicker access. ISPs can place cache engines at strategic points on their networks to improve response times and lower the bandwidth demand on their backbones. ISPs can station cache engines at strategic WAN access points to serve web requests from local storage, rather than from a distant or overburdened web server. In enterprise networks, the dramatic reduction in bandwidth usage due to web caching allows a lower bandwidth WAN link to service the user base. Alternatively, the organization can add users or add more services that make use of the free bandwidth on the existing WAN link. For the end user, the response of the local web cache is almost three times faster than the download time for the same content over the wide area network. Therefore, users see dramatic improvements in response times, and the implementation of web caching is completely transparent to them.

Web caching offers other benefits including access control, monitoring and operational logging. The cache engine provides network administrators with a simple, secure method to enforce a sitewide access policy through Uniform Resource Locator (URL) filtering. Network administrators can learn which URLs receive hits, the number of hits per second the cache is serving, the percentage of URLs that are served from the cache, along with other related operational statistics.

Web caching starts by an end user accessing a web page over the Internet. While the page is being transmitted to the end user, the caching system saves the page and all of its associated graphics on local storage. The page content is now cached. Another user, or the original user can then access the web page at a later time, but instead of sending the request over the Internet to the web server, the web cache system delivers the web page from local storage. This process speeds download times for the user, and reduces the bandwidth demand on the WAN link. Updating of the cache data can occur in a number of ways depending upon the design of the web cache system.

Web caching can be a major problem for publishers of web content. For example, a publisher can gather an inaccurate number of hits if some of the visitors access web content already in a caching server. Furthermore, if a caching server doesn't update content promptly, it can return expired or stale content to users.

SUMMARY OF THE INVENTION

Cache engines are becoming pervasive on the World Wide Web. As a result, the origin web servers do not serve or see the majority of the user requests for web site content. Packet sniffers will not see the requests either, as they are satisfied by cache engines elsewhere on the Internet. The technique of using a single pixel clear GIF (which is not cacheable) has been used to ensure that some record is recorded by the origin server for advertisements for some years. However, this solution only logs information about the request for the single pixel GIF file itself.

The single-pixel transparent GIF (Graphic Interchange Format) is the most flexible tool in a web designer's toolbox. The use of a transparent GIF is a way to discretely control the layout of text and graphics on the web page. No matter where the transparent GIF is placed on the page, it will remain unseen with all background graphics and fills remaining untouched. The single pixel clear GIF has been used before, but the data has not been enriched such that it can be used as a surrogate for the complete set of log records.

The present invention enriches the information recorded in the web logs for the uncacheable single pixel clear GIF by appending additional information to it as Common Gateway Interface (CGI) query string parameters. This enables the log record created by the request for the single pixel clear GIF to function as a "surrogate" for the complete set of log records which would have been created if the page content had not been cached.

DESCRIPTION OF THE DRAWINGS

The invention is better understood by reading the following detailed description of the invention in conjunction with the accompanying drawings, wherein:

FIG. 2 illustrates an exemplary implementation of the uncacheable single pixel GIF with CGI query string parameters added to enrich information recorded in web logs.

FIG. 4 illustrates a site level analysis display that can be generated based on the implementation of the single pixel transparent GIF of the present invention.

FIG. 5 illustrates an exemplary display of referral categories that can be generated based on the implementation of the single pixel transparent GIF of the present invention.

FIG. 6 illustrates an exemplary display of referral category for search engines and directories that can be generated based on the implementation of the single pixel transparent GIF of the present invention.

FIG. 7 illustrates an exemplary display of the referral results for a specific search engine that can be generated based on the implementation of the single pixel transparent GIF of the present invention.

FIG. 8 illustrates exemplary content categories for various web pages that can be generated based on the implementation of the single pixel transparent GIF of the present invention.

FIG. 9 illustrates an exemplary content category for a home page that can be generated based on the implementation of the single pixel transparent GIF of the present invention.

FIG. 10 illustrates an exemplary display of the available saved reports that can be generated based on the implementation of the single pixel transparent GIF of the present invention.

FIGS. 11A–11M illustrate various available saved reports that can be generated based on the implementation of the single pixel transparent GIF of the present invention.

DETAILED DESCRIPTION OF THE INVENTION

Figure 1:
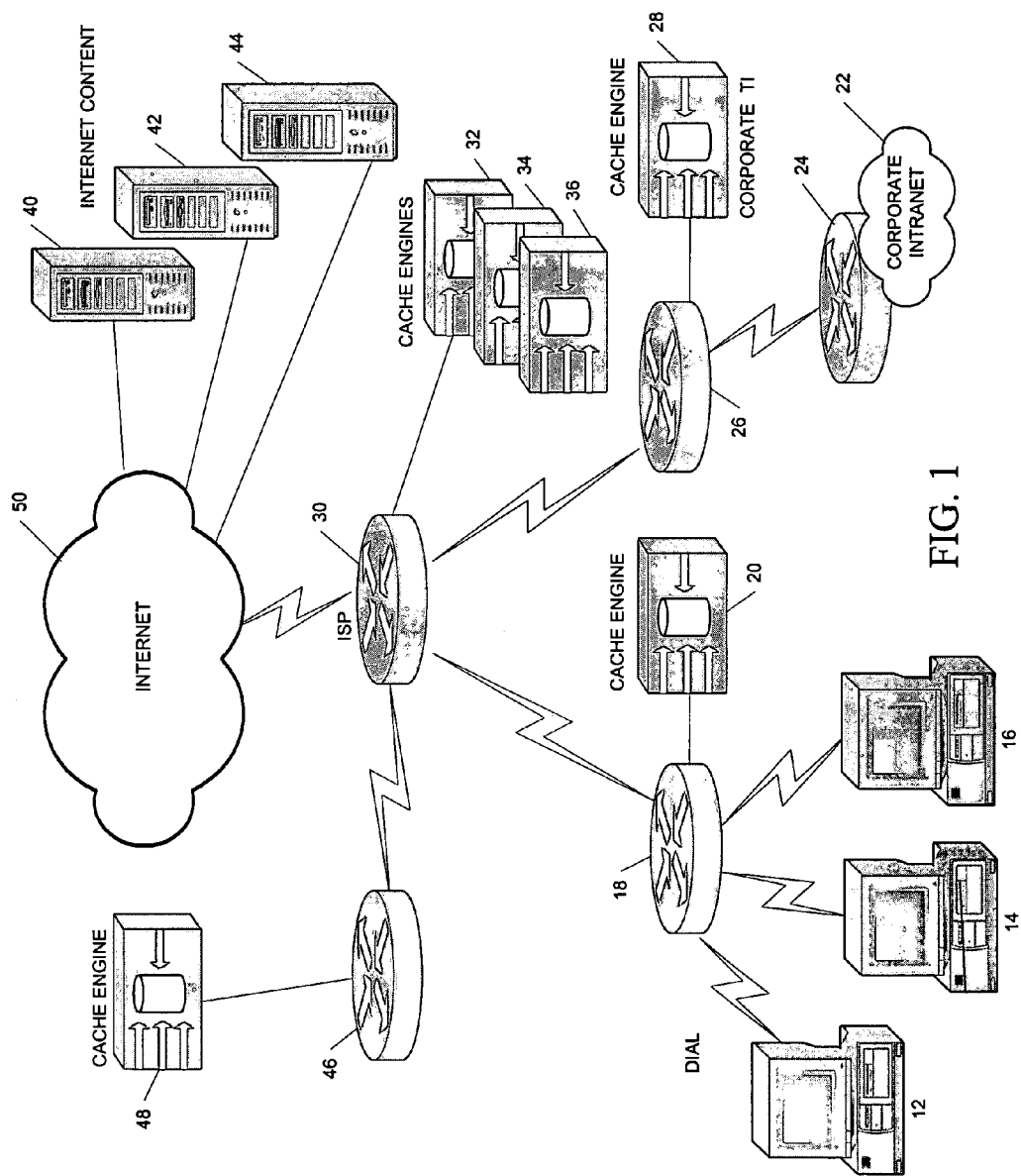
FIG. 1 illustrates an implementation of web cache engines over a global communications network.

Web server software typically collects and saves information pertaining to each HTTP request, including date and time, the originating Internet Protocol (IP) address, the object requested, and the completion status of the request. The logs are analyzed on a periodic basis to determine the traffic through the server in terms of hits, the number of pages served, and the level of demand for pages of interest during each period.

Internet browser applications allow an individual user to cache web pages on his local hard disk. A user can configure the amount of disk space devoted to caching. The first time a user views a website, that content is saved as files in a subdirectory on that computer's hard disk. The next time the user points to this website, the browser gets the content from the cache without accessing the network. Certain elements of the page, including buttons, icons and images, appear much more quickly then they did the first time the page was opened.

To limit bandwidth demand caused by the uncontrolled growth of Internet use, software developers have developed applications that extend local caching to the network level. The two current types of network level caching products are proxy servers and network caches. Proxy servers are software applications that run on general-purpose hardware and operating systems. A proxy server is placed on hardware that is physically between a web browser client application and a web server. The proxy server acts as a gatekeeper that receives all the packets destined for the web server and examines each packet to determine whether it can fulfill the request itself. If the proxy cannot fulfill the request itself, it forwards the request to the web server. Proxy servers can be used to filter requests, e.g., to prevent employees from accessing specific websites. The problem with using proxy servers is that they are not optimized for caching and can fail under a heavy network load. Traffic is slowed to allow the proxy servers to examine each packet, and the failure of the proxy software or hardware causes all users to lose network access. Furthermore, proxy servers require configuration of each end-user's browser, which is an unacceptable option for ISPs and large enterprises. Because of these shortcomings of proxy servers, applications that create network caches have become popular. These caching-focused software applications are designed to improve performance by enhancing the caching software and eliminating the other slow aspects of proxy server implementations. Because a proxy server is run under a general purpose operating system that involves very high per-process context overhead, they are not easily scaleable to large numbers of simultaneous processes.

Networking product vendors offer cache engines as a single purpose network appliance that stores and retrieves content using caching and retrieval algorithms. Such cache engines are dedicated solely to content management and delivery. Since only web requests are routed to the cache engine, no other user traffic is affected by the caching process. For non-web traffic, the router functions entirely in its traditional role. The communications between a cache engine and a router is defined by a cache control protocol. Under this protocol, the router directs only web requests to the cache engine rather than to the intended server. With a cache engine, a client requests web content in the usual manner. A router running a cache control protocol intercepts Transmission Control Protocol (TCP) port 80 web traffic and routes it to the cache engine. The client is not involved in the transaction, and no changes to the client or browser are required. If the cache engine does not have the requested content, it sends the request to the Internet or Intranet in the usual fashion. The content is returned to and stored at the cache engine. The cache engine returns the content to the client. Upon subsequent requests for the same content, the cache engine fulfills the requests from local storage.

FIG. 1 illustrates an implementation of web cache engines over a global communications network such as the Internet. A client computer 12, 14, 16 can request web content via a router 18.

The router 18 intercepts TCP Port 80 web traffic and routes it to the local cache engine 20. The client 12, 14, 16 is not involved in this transaction and no changes to the client computer or browser are required. If the cache engine 20 does not have the requested content, it sends the request via router 18 to the Internet to access an Internet content server 40, 42, 44. The content is returned to, and stored at, the cache engine 20. The cache engine 20 then returns the requested content to the client computer 12, 14, 16 via the router 18. Several cache engines 32, 34, 36 can be placed in a cache farm in a hierarchical fashion at an Internet Service Provider (ISP) site 30. Requests from clients 12, 14, 16 directed through router 18 and ISP server 30, are diverted to the cache farm 32, 34, 36 to fulfill the client request from its storage. If the cache engines 32, 34, 36 are unable to fulfill the request from local storage, a normal web request is made via ISP server 30 over the Internet 50 to an appropriate server 40, 42, 44 for the requested Internet content. In addition to router 18, routers 26, 46 are also shown connected to ISP server 30. Routers 18, 26, 46 are frequently referred to as Points-of-Presence (POPs). A POP is the location of an access point to the Internet and has a unique Internet IP address. A POP usually includes routers, digital/analog call aggregators, servers and frequently frame relay or Asynchronous Transfer Mode (ATM) switches. Shown connected to router 46 is cache engine 48. Connected to router 26 is cache engine 28 and router 24. Router 24 is connected to a corporate intranet 22.

Because the router redirects packets destined for web servers to the cache engine, the cache engine operates transparently to clients. Clients do not need to configure their browsers to be in proxy server mode. In addition, the operation of the cache engine is transparent to the network. The router operates entirely in its normal role for non-web traffic.

A web object can contain a Hypertext Transfer Protocol (HTTP) header to instruct a browser in a caching server how to cache the web object. For a static image, such as a company logo, the expiration header can be set to "no expiration" so that caching servers can keep the image in the cache forever. In order to gather the exact number of hits on a specific page, e.g., an advertisement, a small image object can be added to the page with the object set to expire immediately, so the caching server won't cache the object. Then, every time a user requests that page, the browser or caching server will retrieve the object from the original web server, and the web server can then count the exact number of requests.

The Common Gateway Interface (CGI) is a simple interface (protocol) for running external programs, software or gateways under an information server in a platform-independent manner. CGI is simply a standardized way for sending information between the server and the script. The CGI script is a program that communicates with the server in a standard way. Currently, the supported information servers are HTTP servers. Each CGI server implementation must define a mechanism to pass data about the request from the server to the script.

Each element on a web page form will have a name and value associated with it. The name identifies the data being sent. The value is the data and can either come from the web page designer or from the visitor who types it in a field. When a visitor clicks the submit button, the name-value pair of each form element is sent to the server. CGI scripts generally have two functions. The first is to take all the name-value pairs and separate them out into individual intelligible pieces. The second is to actually do something with that data, such as printing it out, multiplying fields together, sending an email confirmation, or storing it on a server. The form has three important parts: the form tag, which includes the URL of the CGI script that will process the form; the form elements, such as fields and menus; and the submit button which sends the data to the CGI script on the server. Scripts are little programs that add interactivity to a web page. Simple scripts can be written to add an alert box or some text to the web page; more complicated scripts can be written that load particular pages according to the visitor's browser or that change a frame's background color depending on the visitor's mouse clicks. Most scripts are written in a scripting language called JavaScript that is supported by most browsers, including Netscape Communicator and Microsoft Internet Explorer.

JavaScript is an object-oriented language, which means that it works by manipulating objects on a web page, such as windows, images and documents. JavaScript commands are put directly into the HTML file that creates a web page. Depending on the script being run, the commands can be placed into several parts of the file. The commands are frequently placed near the top of the file.

Special codes set off the commands, alerting the browser that they are JavaScript commands. If the commands are put before the HTML <Body> tag at the top of the file, then the script will be able to start executing while the HTML page is still loading. JavaScript is an interpreted language, which means its commands are executed by the browser in the order in which the browser reads them. JavaScript works by taking actions on objects. These actions are called methods. In the basic syntax of JavaScript, the object is first named, and then a period appears follows by the action taken on the object, i.e., the method. So the command to open a new window in JavaScript is window.open. In this instance, window is the object and open is the method. This command opens a new browser window. Other parameters can be added after the command. All the parameters are placed inside one set of parenthesis, with each individual parameter inside quotation marks, with the parameters separated by commas.

An automatic script is executed by the client browser when the web page is loaded. There is no limit to the number of automatic scripts that can be on a web page. The location of the script on the HTML page determines when the script will load. Scripts are loaded in the order in which they appear in an HTML document. An automatic Java Script is added to an HTML document by the following HTML code:

<SCRIPT LANGUAGE="JavaScript">
type content of the script
</SCRIPT>

Some of the older browsers cannot run scripts and will not understand the SCRIPT tag. In order to provide information to a visitor accessing an HTML page, an alternate way to provide information is through the use of the NOSCRIPT tag, followed by the information that is treated as regular text. The older browser won't understand the NOSCRIPT tag and will ignore it, but process the following text. The following is added to the HTML document:

<NOSCRIPT>
type the information
</NOSCRIPT>

In the implementation of the single pixel GIF to create surrogate log files, the following tags and attributes are used as illustrated in FIG. 2 discussed below:

IMG is the HTML tag for inserting images on a page;
ALT is an attribute for offering alternate text that is displayed if the image is not;
SRC is an attribute for specifying the URL of the image;
Also illustrated in FIG. 2 are the following attributes for the IMG tag:
WIDTH, HEIGHT are attributes for specifying the size of the image so that the HTML page can be loaded more quickly;
BORDER is an attribute for specifying the thickness of the border, if any. BORDER=0 omits the border that a browser would otherwise place automatically around an image.

In a preferred embodiment of the present invention, a CGI string of data is appended to the SRC attribute for the single pixel GIF at the time the page is published, as follows:

| | |
|---|---|
| &pag=xxxxxxx | the absolute URL of the page on which the GIF appears; |
| &num=xx | the number of elements (SRCs) on the page at the time of publishing; |
| &ref=xxxxxxxx | the URL of the page which requested the current page (this is done via Java Script). |

In addition, the persistent cookie identification of the user's cookie can be appended to the CGI string of data as follows:

| | |
|---|---|
| &usr=xxxxxxx | the persistent cookie ID of the user cookie (Java Script). |

FIG. 2 illustrates an example of an implementation of the single pixel GIF with the addition of query string parameters to act as a surrogate for the complete set of log records that would have been created had the page content not been cached. In FIG. 2, the Java Script statements are embedded directly on the HTML page. It includes a document object with a write method ("document.write"). The document object contains information on the current document and provides methods for displaying the HTML expressions to the user in a specified window. The IMG and BR tags are the HTML expressions that are displayed in the window. The BR CLEAR tag and attribute simply create a line break and stop text wrap. The SRC attribute following the IMG tag provides the absolute URL of the page containing the single pixel clear GIF ("uc.GIF"); i.e., SRC="http://census.rolandgarros.org/rc/images/uc.GIF-?pag='+location.pathname+'&num=14'+r+'".

The CGI string following uc.GIF indicates that there are 14 SRC elements on the HTML page. The URL of the referrer page is indicated by a variable "r", which is defined as '&ref='+top.document.referrer based on a true condition to the "if" statement (i.e., the document referrer object is not empty). The Java Script top.document.referrer reflects the URL of the calling document (i.e., referrer page) that the user was viewing before the current page.

In the event the client browser cannot interpret a scripting language, the NOSCRIPT tag demarcates the HTML statements to be interpreted by the browser. This includes the IMG tag wherein the SRC attribute has a query string after "uc.GIF" that is modified to include the default URL of the HTML page (i.e., "index.html"). The index.html file is the default file for the top level directory on the web site.

In order to serve up web pages, web sites need a host computer and server software that runs on the host. The host manages the communications, protocols, and houses the pages and related software required to create a website on the Internet. The server software resides on the host and serves up the pages, and otherwise acts on the requests sent by the client's browser software. The server handles the HTTP requests and communications with the host operating system, which in turn handles the TCP/IP communications. There are different types of server software that perform different types of services for different types of clients. Specifically, a web server is an HTTP server and its function is to send information to the client software (browser) using the HyperText Transfer Protocol. The client browser requests that the server return an HTML document. The server receives this request and sends back a response. The top portion of the response includes transmission information and the rest of the response is the HTML file. In addition to sending pages to the browser, a web server also passes requests to run CGI scripts to CGI applications. These scripts run external mini-programs, such as a database lookup or interactive forms processing. The server sends the script to the application via CGI and communicates the script back to the browser. The server software also includes configuration files and utilities to secure and manage the website in a variety of ways.

Figure 3:
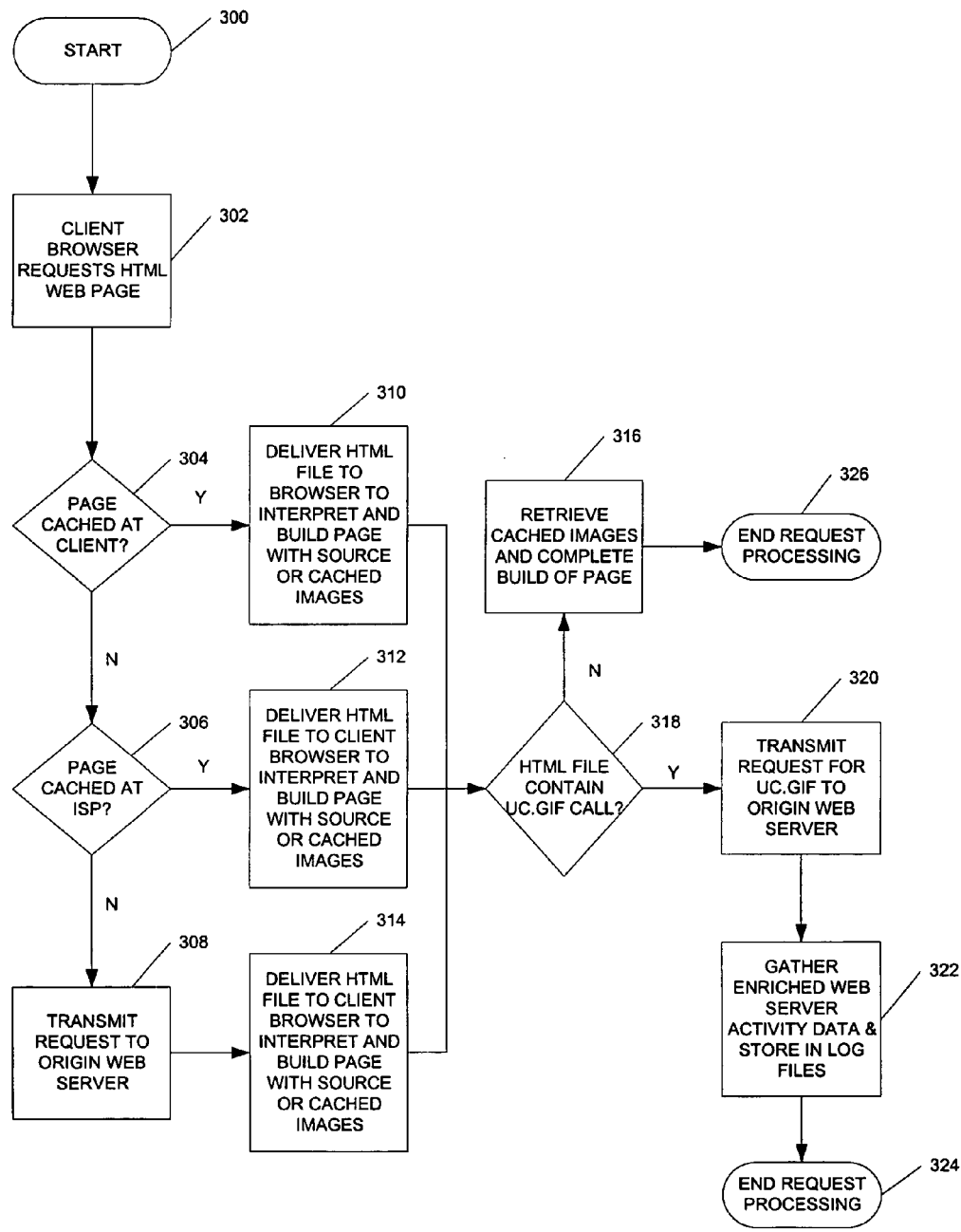
FIG. 3 illustrates the processing logic for handling client requests for web pages utilizing the single pixel transparent GIF in accordance with a preferred embodiment of the present invention.

FIG. 3 illustrates the processing logic of the present invention. The process starts in start block 300. In logic block 302, the client browser software requests an HTML web page. The client browser determines if the requested HTML page has been cached at the client in decision block 302. If the page has been cached at the client, then the HTML file is delivered to the browser as indicated in logic block 310. The browser interprets the HTML file and builds the web page with source (i.e., from the origin web server) or cached images. The cached images can be available locally or at an ISP, or at a router or other network device along the path. If in decision block 304, it is determined that the page is not cached at the client, then another test is performed in decision block 306 to determine if the page has been cached at an ISP. The ISP cache test is intended to be illustrative of an embodiment of the invention. The next hop from the client can be to a server on an intranet which has a TCP/IP address and provides direct Internet access. If the page has been cached along the path, then, as indicated in logic block 312, the HTML file is delivered to the client browser to interpret the HTML code and build the web page with images that have been cached or retrieved from the origin web server. If the page has not been cached along the path to the web server, the request for the page is transmitted to the host where the web server software processes the request as indicated in logic block 308. If the browser has requested an HTML file, the web server retrieves the original source HTML file, attaches a header to the file, and send the file to the browser as indicated in logic block 314.

Once the browser has received the HTML file from the processing in logic blocks 310, 312 or 314, a test is made in decision block 318 to determine if the HTML file contains an uncacheable single pixel GIF (represented by uc.GIF in this invention). If it does not, the retrieved cached images are displayed to complete the build of the web requested web page in logic block 316. Processing of the request is then completed as indicated by termination block 326. If, in decision block 318, a uc.GIF request is found in the HTML file, then the uc.GIF and CGI query string are transmitted to the origin web server in logic block 320 where they are analyzed to gather the enriched web server activity data made possible by this invention. The browser again interprets the HTML code and builds the page with source or cached images. Using the example of FIGS. 2, 14 hits are recorded for the web page, including one for the transmitted uc.GIF request and 13 for the other source images that are retrieved based on the HTML IMG SRC tags/attributes in the HTML file. This represents the surrogate nature of using the uncacheable single pixels GIF requests. The referrent page for the 14 hits is also contained as part of the CGI query string. In FIG. 2, this is represented by "r='&ref='+top.document.referrer". The gathering and storing of this enriched web server activity data is indicated by logic block 322. The request processing then ends as indicated in termination block 324.

When a user visits a website, the browser examines the URL and looks into a cookie file stored on the client computer's hard drive. If the browser finds a cookie associated with that URL, it sends that cookie information to the server. If no cookie is associated with the URL, the server places a cookie inside the cookie file. Some sites may first ask a series of questions, such as name and password, and then will place a cookie on the hard disk with that information in it. This is typical of sites that require registration. Commonly, a GCI script on the server takes the information that the user has entered and then writes a cookie onto the client computer's hard disk. When the user leaves a web site, the cookie information remains on the hard disk so that the site can recognize the user the next time the user visits the web site, unless the cookie has specifically been written to expire when the user leaves the site.

With the capability to gather enriched information through the use of the single pixel GIF described above, much more detailed and accurate information regarding web site activity can be collected and stored in multidimensional databases, including multidimensional implementations of a relational database. Furthermore, this collected data also can be analyzed using relatively new techniques such as On-line Analytical Processing (OLAP), described briefly below.

On-Line Analytical Processing (OLAP) describes a class of technologies that are designed for live ad hoc data access and analysis. While transaction processing generally relies on relational databases, OLAP has become synonymous with multidimensional views of business data. These multidimensional views are supported by multidimensional database technology. OLAP applications are used by analysts who frequently want a higher level, aggregated view of the data, such as total sales by product line, by region, etc. The OLAP database is usually updated in batch mode, often from multiple sources, and provides an analytical backend to multiple user applications.

FIG. 4 illustrates an exemplary site level analysis display that can be derived from the collecting of accurate hit information using the single pixel GIF as a surrogate for the complete set of log records which would have been generated if the web page content had not been cached. The figure depicts the various measurements that can be made for selected intervals of time and includes hits, pages visited, seconds per page view, visits, hits per visit, page views per visit, and seconds per visit.

FIG. 5 illustrates an exemplary referral categories display that can be generated from the use of the single pixel GIF to log information pertaining to the web page referral source. The different referral categories include commercial, education, government, internal referrals, ISP referrals, and search engines and directories among them. Again, the data is presented for selected intervals of time (e.g., calendar weeks). The various referral categories are underlined, which means that they can "drilled down" to sub-referral categories as illustrated in FIG. 6.

FIG. 6 illustrates the breakdown of the search engines and directories referral category for the selected intervals of time based on the referrals made from common search engines or browsers. For example, during the week ending June 10 in which the peak number of page referrals occurred, over 71% were referred by the Yahoo search engine. Further drill down is possible into the search engine referral category as indicated by the underlined subcategories.

FIG. 7 illustrates a further drill down of the AltaVista referral subcategory. For example, the display shows that 84% of the referrals from AltaVista during the week ending June 3 originated from a CGI query string on the AltaVista home page. No further drill downs are possible in this referral subcategory.

FIG. 8 illustrates an exemplary display of web page by content categories that can be derived from the collecting of accurate hit information using the single pixel GIF as a surrogate for the complete set of log records which would have been generated if the web page content had not been cached. The content categories include draws, home page, news and photos, players, scoreboard, and shop (gift shop) among other content categories. The data is presented for selected intervals of time. The various content categories are underlined which means they can be drilled down to a lower level of detail.

FIG. 9 illustrates a drill down of the home page content category. The resources include the English version home page (/en) accessible via a Java Script-enabled browser; the French version home page (/fr) accessible via a Java Script-enabled browser; the English version home page (/en/index.html) accessible from a browser that is not Java Script-enabled, etc. For the peak traffic week ending June 10, 58% of the home page traffic was directed to the English-version page and initiated from a Java Script-enabled browser. Slightly less than 42% of the traffic was directed to the French-version page initiated from a Java Script-enabled browser.

FIG. 10 illustrates a display of exemplary saved reports that can be generated using OLAP processing of the surrogate log records created through the use of the single pixel GIF of this invention. The saved reports include site level reports, visit distribution reports, traffic reports, content reports, domain/sub-domain reports etc. Each of the listed reports is underlined indicating that a detailed report is available simply by clicking on the report name.

FIGS. 11A–11M illustrate the format of the corresponding exemplary saved report. FIG. 11A shows the site level report that is available. In this instance, the available site level report is a site traffic report. The report name is underline indicating that a further drill down to a detailed report results from clicking on the report name. Such action would generate a display like that of FIG. 4. The available visit distribution reports are listed in the display of FIG. 11B. FIGS. 11C–11K and 11M illustrate various saved reports that are basically "top 10" lists. FIG. 11C depicts traffic reports and enables display of the top 10 requested resources. FIG. 11D depicts content reports and enables display of the top 10 most requested pages. FIG. 11E depicts sub-domain reports and enables display of the top 10 sub-domains by either pages viewed or by number of visits. FIG. 11F depicts domain reports and enables display of the top 10 domains by either pages viewed or by number of visits. FIG. 11G depicts referral reports and enables display of the top 10 referrals by pages viewed or by number of visits. FIG. 11H depicts entry page reports and enables display of the top 10 site entry pages. FIG. 11I depicts exit page reports and enables display of the top 10 exit pages. FIG. 11J depicts browser reports and enables display of the top 10 browsers by either pages viewed or by number of visits. FIG. 11K depicts platform reports and enables display of the top 10 platforms by pages viewed of by the number of visits. FIG. 11L depicts usage cluster reports and enables display of usage cluster visits. FIG. 11M depicts ad reports and enables display of the top 10 ads by impression created. All of the available saved reports are presented for selected intervals of time such as the most recent five weeks.

The corresponding structures, materials, acts, and equivalents of any means plus function elements in any claims below are intended to include any structure, material, or acts for performing the functions in combination with other claimed elements as specifically claimed.

While the invention has been particularly shown and described with reference to embodiments thereof, it will be understood by those skilled in the art that various changes in form and detail may be made without departing from the spirit and scope of the present invention.

What is claimed is:

1. A system for obtaining enriched activity data in a client-server communications network wherein information requested by a network element is cached at one or more other network elements, comprising:
a server network element including server software and a database for generating and storing a plurality of information files that are accessible to a requesting network element, the information files including text files and key words that are interpreted by the requesting network element to display the information requested, the information file further including an uncacheable single pixel Graphics Image Format (GIF) request;
wherein upon interpreting the information file, the single pixel GIF request is transmitted from the requesting element over the communications network to the server network element which reads and stores enriched data contained therein.

2. The system for obtaining enriched activity data of claim 1 further comprising one or more cache engines that are connected to at least one of the other network elements for temporarily storing requested information files that are served upon demand to the requesting network element.

3. The system for obtaining enriched activity data of claim 1 wherein the single pixel GIF request includes a Common Gateway Interface (CGI) query string appended to it that contains the enriched data.

4. The system for obtaining enriched activity data of claim 3 wherein the CGI query string includes an identification of the location of the requested information file.

5. The system for obtaining enriched activity data of claim 3 wherein the CGI query string includes a number of image objects contained in the information file.

6. The system for obtaining enriched activity data of claim 3 wherein the CGI query string includes an identification of a network element that referred the requesting network element to the server network element.

7. The system for obtaining enriched activity data of claim 3 wherein the CGI query string includes a persistent cookie identification of the requesting network element.

8. The system for obtaining enriched activity data of claim 1 wherein the client-server communications network is a global network such as the Internet.

9. The system for obtaining enriched activity data of claim 1 wherein the plurality of information files are hypertext documents written with HyperText Markup Language (HTML) tags.

10. The system for obtaining enriched activity data of claim 9 wherein the hypertext documents contain source HTML code interpreted by the requesting element to generate the display of corresponding web pages stored at the server network element.

11. The system for obtaining enriched activity data of claim 1 wherein the server network element is a HyperText Transfer Protocol (HTTP) server.

12. The system for obtaining enriched activity data of claim 1 wherein the requesting network element is a client browser application.

13. The system for obtaining enriched activity data of claim 9 wherein the single pixel GIF request with an appended Common Gateway Interface (CGI) query string is included as part of a JavaScript command that is put directly into the HTML file.

14. The system for obtaining enriched activity data of claim 13 wherein the JavaScript command is a "document.write" command which places an expression that follows the command into a document window.

15. The system for obtaining enriched activity data of claim 14 wherein the expression contains a HyperText Markup Language (HTML) image (IMG) tag with a source (SRC) attribute that specifies the Uniform Resource Locator (URL) location for the hypertext document.

16. The system for obtaining enriched activity data of claim 1 wherein the other network elements include any one or more of switch devices, router devices, gateways, and client computer devices.

17. A method for obtaining enriched activity data in a client-server communications network wherein information requested by a network element is cached at one or more other network elements, comprising the acts of:
- generating and storing a plurality of information files at a server network element that are accessible to a requesting network element, the information files including text files and key words and a single pixel Graphics Image Format (GIF) request;
- interpreting the information files including the text files, key words and single pixel GIF request by the requesting network element to display the information requested;
- transmitting the single pixel GIF request from the requesting element over the communications network to the server network element, and
- reading and storing the enriched activity data contained in the transmitted single pixel GIF request at the server network element.

18. The method for obtaining enriched activity data of claim 17 further comprising the act of temporarily storing the requested inform files that are served on demand to the requested network element by one or more cache engines that are connected to at least one of the other network elements.

19. The method for obtaining enriched activity data of claim 17 further comprising the act of appending a common gateway interface (CGI) query string to the single pixel GIF request.

20. The method for obtaining enriched activity data of claim 19 wherein the CGI query string includes an identification of the location of the requested information file.

21. The method for obtaining enriched activity data of claim 19 wherein the CGI query string includes a number of image objects contained in the information file.

22. The method for obtaining enriched activity data of claim 19 wherein the CGI query string includes an identification of a network element that referred the requesting network element to the server network element.

23. The method for obtaining enriched activity data of claim 19 wherein the CGI query string includes a persistent cookie identification of the requesting network element.

24. The method for obtaining enriched activity data of claim 17 wherein the client-server communications network is a global network such as the Internet.

25. The method for obtaining enriched activity data of claim 17 wherein the plurality of information files are hypertext documents written with HyperText Markup Language (HTML) tags.

26. The method for obtaining enriched activity data of claim 25 further comprising interpreting the source HTML code in the hypertext documents by the requesting element to generate a display of corresponding web pages stored at the server network element.

27. The method for obtaining enriched activity data of claim 17 wherein the hypertext documents are stored at a HyperText Transfer Protocol (HTTP) server.

28. The method for obtaining enriched activity data of claim 17 wherein the requesting network element is a client browser application.

29. The method for obtaining enriched activity data of claim 25 further including the single pixel GIF request with an appended Common Gateway Interface (CGI) query string is included as part of a JavaScript command that is put directly into the HTML file.

30. The method for obtaining enriched activity data of claim 29 wherein the JavaScript command is a "document.write" command which places an expression that follows the command into a document window.

31. The method for obtaining enriched activity data of claim 30 wherein the expression contains a HyperText Markup Language (HTML) image (IMG) tag with a source (SRC) attribute that specifies the Uniform Resource Locator (URL) location of the hypertext document.

32. A computer readable medium containing a computer program for obtaining enriched activity data in a client-server communications network wherein information requested by a network element is cached at one or more other network elements, the computer program product comprising:
- program instructions that generate and store a plurality of accessible information files at a server network element, the information files including text files and key words and a single pixel Graphics Image Format (GIF);
- program instructions that receive the single pixel GIF request from the requesting element when the requesting element interprets the contents of the information file; and
- program instructions that read and store the enriched activity data contained in the transmitted single pixel GIF request at the server network element.

33. The computer program product for obtaining enriched activity data of claim 32 further comprising program instructions that append a common gateway interface (CGI) query string to the single pixel GIF request.

34. The computer program product for obtaining enriched activity data of claim 33 wherein the CGI query string includes an identification of the location of the requested information file.

35. The computer program product for obtaining enriched activity data of claim 33 wherein the CGI query string includes a number of image objects contained in the information file.

36. The computer program product for obtaining enriched activity data of claim 33 wherein the CGI query string includes an identification of a network element that referred the requesting network element to the server network element.

37. The computer program product for obtaining enriched activity data of claim 33 wherein the CGI query string includes a persistent cookie identification of the requesting network element.

38. The computer program product for obtaining enriched activity data of claim 32 wherein the plurality of information files are hypertext documents written with HyperText Markup Language (HTML) tags.

39. The computer program product for obtaining enriched activity data of claim 32 further comprising program instructions that store the hypertext documents at a HyperText Transfer Protocol (HTTP) server.

40. The computer program product for obtaining enriched activity data of claim 38 further comprising program instructions that place a JavaScript command, including the single pixel GIF request with an appended Common Gateway Interface (CGI) query string directly into the HTML file.

41. The computer program product for obtaining enriched activity data of claim 40 wherein the JavaScript command is a "document.write" command which places an expression that follows the command into a document window at a requesting network element.

42. The computer program product for obtaining enriched activity data of claim 41 wherein the expression contains a HyperText Markup Language (HTML) image (IMG) tag with a source (SRC) attribute that specifies the Uniform Resource Locator (URL) location of the hypertext document.

* * * * *